United States Patent
Ferguson

(10) Patent No.: US 7,848,779 B2
(45) Date of Patent: Dec. 7, 2010

(54) STORAGE MEDIUM FOR A CELLULAR TELEPHONE

(75) Inventor: Lee H. Ferguson, Glenn Heights, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 928 days.

(21) Appl. No.: 11/683,348

(22) Filed: Mar. 7, 2007

(65) Prior Publication Data

US 2008/0220830 A1  Sep. 11, 2008

(51) Int. Cl.
*H04B 1/38* (2006.01)
*H04M 1/00* (2006.01)

(52) U.S. Cl. .................. 455/557; 455/550.1; 455/575.1

(58) Field of Classification Search .............. 455/575.1, 455/466, 550.1, 556.1, 557
See application file for complete search history.

(56) References Cited

U.S. PATENT DOCUMENTS

| | | | | |
|---|---|---|---|---|
| 5,333,177 | A * | 7/1994 | Braitberg et al. ............. | 455/559 |
| 5,689,654 | A * | 11/1997 | Kikinis et al. ................ | 710/303 |
| 7,401,182 | B2 * | 7/2008 | Le et al. ...................... | 711/115 |
| 7,583,955 | B2 * | 9/2009 | Shin .......................... | 455/414.1 |
| 7,612,766 | B2 * | 11/2009 | Shintome ..................... | 345/173 |
| 2003/0036351 | A1 * | 2/2003 | Forbes ......................... | 455/41 |
| 2003/0045327 | A1 * | 3/2003 | Kobayashi et al. ........... | 455/557 |
| 2003/0186719 | A1 * | 10/2003 | Yamaguti et al. ......... | 455/550.1 |
| 2004/0085573 | A1 * | 5/2004 | Aidinejad ................... | 358/1.15 |
| 2004/0128575 | A1 * | 7/2004 | Schmidt ...................... | 713/322 |
| 2004/0203352 | A1 * | 10/2004 | Hall et al. ................... | 455/41.1 |
| 2004/0214551 | A1 * | 10/2004 | Kim .......................... | 455/412.1 |
| 2005/0037709 | A1 * | 2/2005 | Hwang ....................... | 455/66.1 |
| 2005/0245272 | A1 * | 11/2005 | Spaur et al. ................ | 455/456.3 |
| 2006/0004974 | A1 * | 1/2006 | Lin et al. ..................... | 711/164 |
| 2006/0116165 | A1 * | 6/2006 | Ito ............................. | 455/557 |
| 2006/0148510 | A1 * | 7/2006 | Zhang ...................... | 455/550.1 |
| 2006/0154676 | A1 * | 7/2006 | Kraft et al. ................... | 455/466 |
| 2007/0042745 | A1 * | 2/2007 | Tezuka ..................... | 455/343.1 |
| 2007/0053544 | A1 * | 3/2007 | Jhao et al. ................... | 381/384 |
| 2008/0096486 | A1 * | 4/2008 | Whitten ..................... | 455/66.1 |

OTHER PUBLICATIONS

Gizmodo, Samsung SPH-V5400: First Cellphone with Hard Drive, 6 pages article. http://gizmodo.com/gadgets/tag/samsung-sphv5400-first-cellphone-with-hard-drive-20835.php; website last visited Mar. 7, 2007.

* cited by examiner

*Primary Examiner*—Vincent P Harper
*Assistant Examiner*—Nathan Mitchell
(74) *Attorney, Agent, or Firm*—Pablo Meles; Guntin Meles & Gust, PLC

(57) ABSTRACT

A storage medium for a cellular telephone is disclosed. An apparatus that incorporates teachings of the present disclosure may include, for example, a cellular telephone having a housing assembly, and a Modular Hard Disk Drive (MHDD) storage medium that couples to the housing assembly as an integral portable accessory unit. The housing assembly can have a wireless transceiver that exchanges messages with at least one among a plurality of cellular base stations, and a controller that manages operations of the wireless transceiver and the MHDD storage medium. Additional embodiments are disclosed.

21 Claims, 3 Drawing Sheets

STORAGE MEDIUM FOR A CELLULAR TELEPHONE

FIELD OF THE DISCLOSURE

The present disclosure relates generally to communication devices, and more specifically to a storage medium for a cellular telephone.

BACKGROUND

As cellular telephones incorporate multimedia functions such as still and video capture, video playback (e.g., MPEG 4) and/or stereo audio playback (e.g., MP3 files), memory capacity becomes an essential limitation. Nonvolatile memories with non-moving mechanisms such as Flash memories have been utilized by cellular telephones for storage of multimedia files. Flash memories and like devices, however, have limited capacity for storing a large number of multimedia files such as music files, movies, video recordings and so on. Consequently, an end user of a cellular telephone often has to manage the phone's memory by downloading or deleting multimedia files to make room for other files on a frequent basis.

A need therefore arises for a storage medium for a cellular telephone that improves the aforementioned deficiency in the art.

DETAILED DESCRIPTION

Embodiments in accordance with the present disclosure provide a storage medium for a cellular telephone.

In a first embodiment of the present disclosure, a cellular telephone can have a housing assembly, and a Modular Hard Disk Drive (MHDD) storage medium slideably insertable and removable from the housing assembly. The housing assembly can have a wireless transceiver that exchanges messages with a communication system, and a controller that manages operations of the wireless transceiver and the MHDD storage medium.

In a second embodiment of the present disclosure, a cellular telephone can have a housing assembly, and an MHDD storage medium that couples to the housing assembly as an integral portable accessory unit. The housing assembly can have a wireless transceiver that exchanges messages with at least one among a plurality of cellular base stations, and a controller that manages operations of the wireless transceiver and the MHDD storage medium.

In a third embodiment of the present disclosure, a Modular Hard Disk Drive (MHDD) can have a storage medium having at least one or more spinnable platters comprising magnetic material, a communications interface, a controller that manages read-write operations of the storage medium and communications between the MHDD and a cellular telephone, and a housing assembly that houses the foregoing components and modularly couples the MHDD to the cellular telephone as an integral portable accessory unit.

Figure 1:
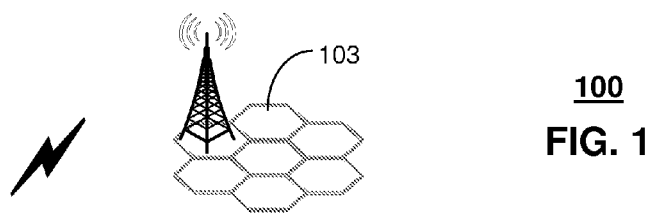
FIG. 1 depicts an exemplary embodiment of a communication system.

FIG. 1 depicts an exemplary embodiment of a communication system 100 comprising a plurality of base stations 103 that provide wireless communication services to a corresponding plurality of cellular telephones 101. The cellular base stations 103 operate according to a frequency-use plan that utilizes common communication protocols such as GSM, CDMA, UMTS, or other similar techniques. Next generation communication protocols such as Worldwide Interoperability for Microwave Access (WiMAX), Ultra Wide Band (UWB), and software defined radio (SDR) can also be applied to the communication system 100. SDR can be utilized for accessing public and private communication spectrum with any number of communication protocols that can be dynamically downloaded over-the-air to the cellular telephone 101 and/or cellular base stations 103.

The cellular telephone 101 can comprise a wireless transceiver 102, a user interface (UI) 104, an image sensor 114, a power supply 116, and a controller 106 for managing operations of the foregoing components. The wireless transceiver 102 can utilize common communication technologies to support singly or in combination any number of wireless access technologies including without limitation Bluetooth™, Digital Enhanced Cordless Telecommunications (DECT), Wireless Fidelity (WiFi), WiMAX, UWB, SDR, and cellular access technologies such as CDMA, GSM, and UMTS. Next generation wireless access technologies can also be applied to the present disclosure as described earlier.

The UI 104 can include a keypad 108 with depressible or touch sensitive keys and a navigation disk for manipulating operations of the cellular telephone 101. The UI 104 can further include a display 110 such as monochrome or color LCD (Liquid Crystal Display) for conveying images to an end user of the cellular telephone 101, and an audio system 112 that utilizes common audio technology for conveying and intercepting audible signals of the end user. The imaging sensor 114 can operate as a digital camera utilizing common imaging sensing technology such a charge coupled device (CCD) sensor for capturing still and moving images.

The power supply 116 can utilize common power management technologies such as replaceable batteries, supply regulation technologies, and charging system technologies for supplying energy to the components of the cellular telephone 101 and to facilitate portable applications. The controller 106 can utilize computing technologies such as a microprocessor and/or digital signal processor (DSP) with associated storage memory such a Flash, ROM, RAM, SRAM, DRAM or other like technologies for controlling operations of the cellular telephone 101.

The cellular telephone 101 can further include a communications interface such as an 10 port 107 having an electromechanical assembly for coupling to a modular hard disk drive (MHDD) storage medium 122 (herein MHDD 122). The MHDD 122 can engage with a housing assembly carrying the aforementioned components 101-116 of the cellular telephone 101 according to any number of mechanical coupling methods.

For example, the MHDD 122 can slidably engage in a lateral direction 207 with the housing assembly 201 by way of a slot 206 of said assembly. At a far end of the slot 206, an electromechanical connector 203 (serving as the IO port 107) can engage with a mating electromechanical connector 205 of the MHDD 122, thereby electrically coupling the controller 106 to the MHDD by way of said IO port. The slot 206 of the housing assembly can further comprise first and second grooves 204, 206 that support a corresponding first and second contoured sides 214, 216 of the MHDD 122 during insertion and removal of the MHDD. Referring back to FIG. 1, the MHDD 122 can further comprise another electromechanical connector which can be used to couple to a computing device 124 such as a computer, printer, or multimedia processing center (e.g., a photo development machine at a commercial enterprise). The tethered wired interface 121 can represent, for example, a USB or FireWire interface connecting the MHDD 122 to the computing device 124.

The MHDD 122 can comprise common hard disk drive technology such as one or more spinnable platters 212 with magnetic surfaces for magnetically reading and writing digitized data by way of a probe 210 that can measure modify magnetization on the spinnable platters. The components of the MHDD 122 can be miniaturized so that the MHDD compactly couples to the cellular telephone 101 with minimal bulk. While coupled to the cellular telephone 101, the MHDD 122 can derive its power from the IO port 107 by way of the cellular telephone's 101 power supply 114. Alternatively, the MHDD 122 can incorporate its own portable power supply 117 utilizing common battery-powered technologies (such as those described for power supply 114).

The MHDD 122 can further include a security element 119 and a wireless interface 120. The security element 119 can be utilized to prevent tampering and theft of the MHDD. The security element 119 can be represented, for example, a Subscriber Identity Module (SIM), a Removable User Identity Module (RUIM), or other common security and verification device suitable for the present disclosure. The SIM and/or RUIM can be slidably coupled to the MHDD 122 or can be an integral part thereof. The SIM and/or RUIM can be used for both end user validation (e.g., password protected operation of the MHDD 122) and for supplying common provisioning information to the cellular telephone 101 for managing communication operations with the communication system 100.

The wireless interface 120 can utilize common short-range communications technology (e.g., Bluetooth, WiFi, Zigbee, etc.) to wirelessly couple the MHDD 122 to the cellular telephone 101 and/or the local computing device 124. The wireless interface 120 can therefore obviate a need for electromechanical connectors 203 and 205 as well as a need to tether the computing device 124 to wired interface 121.

Figure 3:
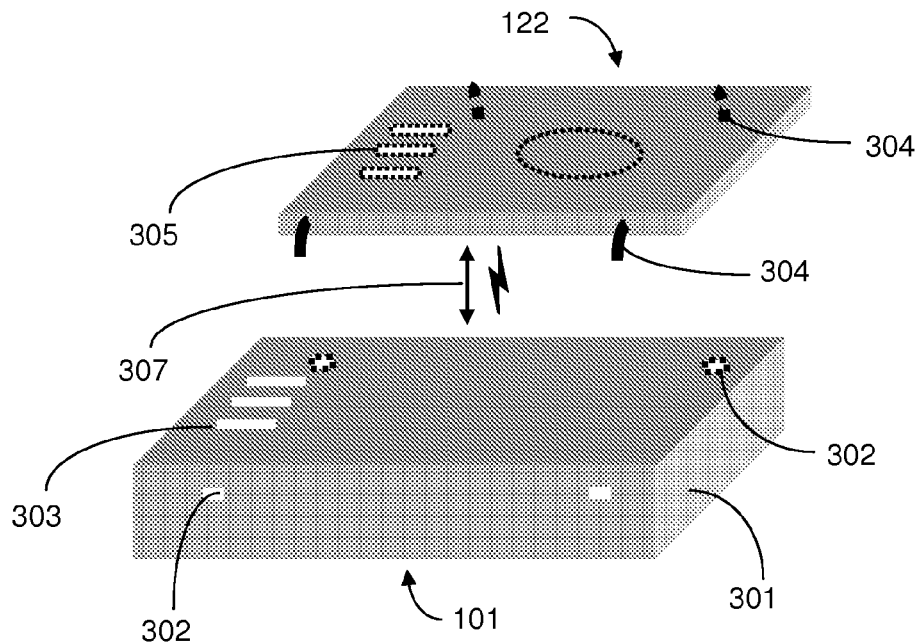

Alternatively, a housing assembly 301 of the cellular telephone 101 can utilize a snap-on mechanism for coupling to the MHDD 122 as shown in FIG. 3. In this embodiment, a housing assembly of the MHDD 122 can have a plurality of snap-on clips 304 that can flexibly engage with a corresponding plurality of slots 302, thereby firmly fixing the MHDD to the housing assembly 301 of the cellular telephone 101. Based on the flexibility of the snap-on clips, the MHDD 122 can be forcibly removed from the cellular telephone 101. As part of this assembly, the housing assembly 301 of the cellular telephone can comprise electrical contacts 303 that can engage with corresponding electrical contacts 305 on a bottom side of the MHDD 122. These contacts can be utilized to electrically couple the controller of the MHDD 122 with the controller 106 of the cellular telephone 101 for managing operations of the MHDD.

Figure 2:
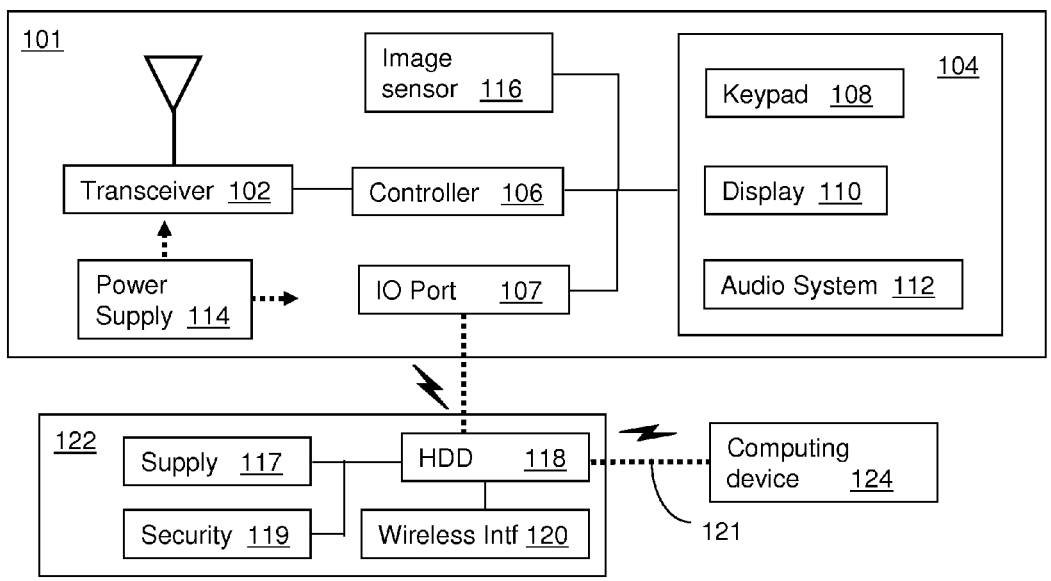
FIGS. 2-3 depict exemplary embodiments for coupling a Modular Hard Disk Drive (MHDD) storage medium to a cellular telephone of the communication system.
Figure 2:
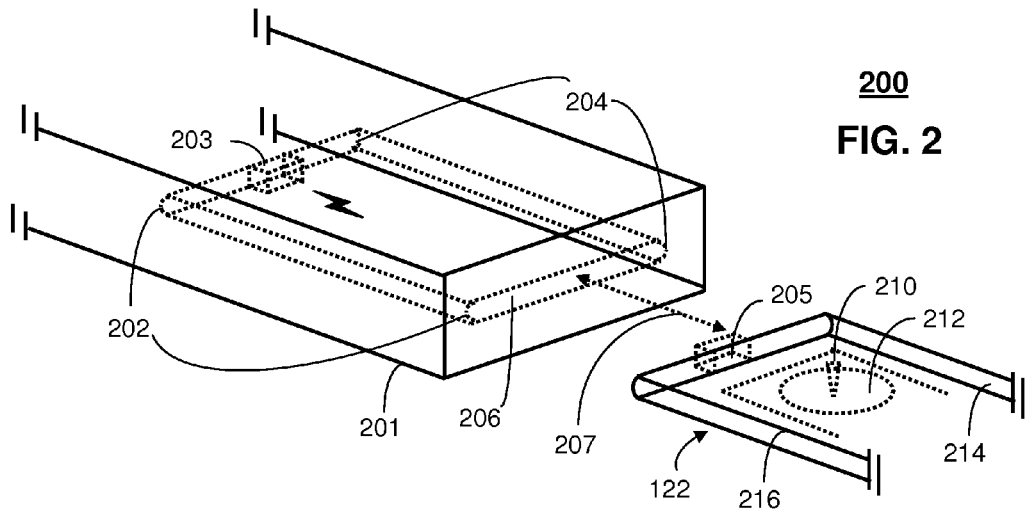

Alternatively, by way of the wireless interface 120, the electrical contacts 303, 305 can be obviated and communications between the MHDD 122 and the cellular telephone 101 can take place wirelessly while physically engaged. Referring back to FIG. 2, the same can be said for the embodiment in which the MHDD 122 slideably engages with the cell phone 101. That is, by way of the wireless interface 120 the MHDD 122 can communicate wirelessly with the cellular telephone 101 while connectors 203 and 205 serve only the purpose to mechanically engage said devices.

In yet another embodiment, the MHDD 122 can operate under the control of the cellular telephone 101 without physical engagement with the cellular telephone 101 or the computing device 124. In this embodiment, the MHDD 122 utilizes the wireless interface 120 to communicate with the cellular telephone 101 at 20 to 50 meters and the portable supply 117 can be used to power the controller of the MHDD and other storage media components of the HDD 118. In this instance an end user can store the MHDD 122 in a suitable location such as a purse, shirt pocket, business bag or other suitable location desired by the end user while utilizing the resources of the MHDD.

Figure 4:
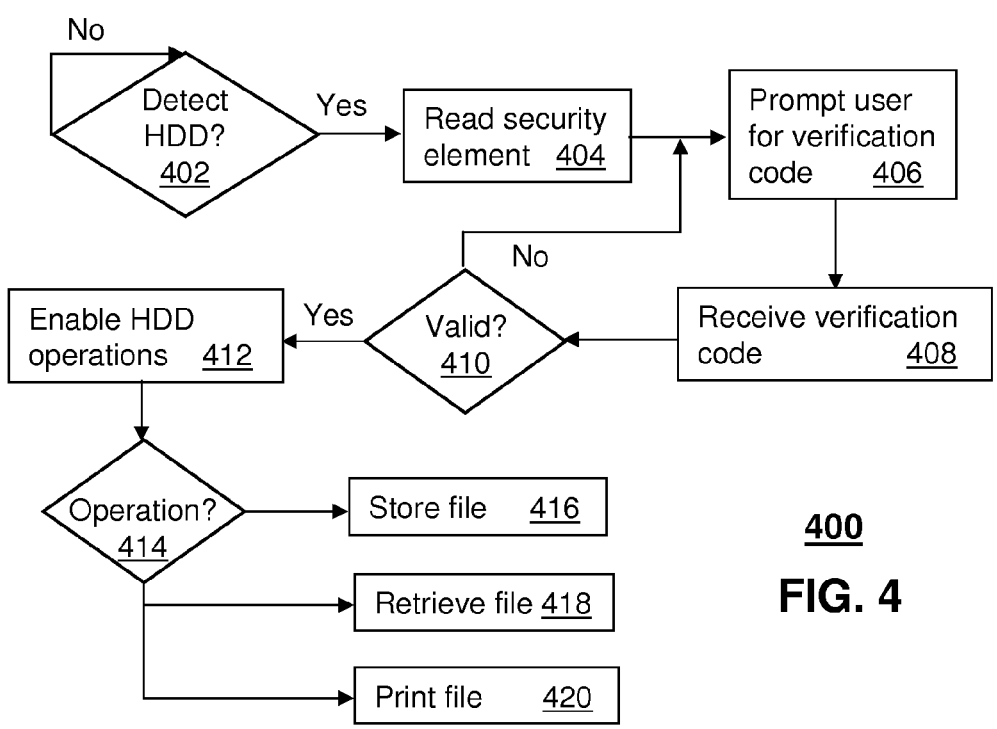
FIG. 4 depicts an exemplary method operating in portions of the MHDD and the cellular telephone.

FIG. 4 depicts an exemplary method 400 operating in portions of the MHDD 122 and the cellular telephone 101. Method 402 begins the controller 106 of the cellular telephone 101 being programmed to monitor a physical or wireless coupling to the MHDD 122. When the MHDD 122 is detected by wired or wireless contact, the controller 106 proceeds to step 404 where it communicates with the security element 119 of the MHDD and prompts the end user of the cellular telephone 101 by way of the UI 104 to enter a verification code (e.g., a password or personal identification number). The presentation by the UI 104 can be visual and or audio, while response by the end user can be captured by tactile and/or audio responses.

In step 410, the controller 106 can determine if the verification code entered is valid. If it is not, the controller 106 returns to step 406 for a limited number of retries (e.g., no more than three attempts). If the verification code supplied is valid, the controller 106 proceeds to step 412 where it enables use of the MHDD 122 for storing (step 416), retrieving (step 418), and/or printing (step 420) of multimedia files. The storing step 416 can result from recording audio and/or still or video images with the audio system 112 and the image sensor 116, respectively. The storing step 416 can also result from downloading multimedia files from the computing device 124 wirelessly or over a tethered interface 121. The retrieving step 418 can be the result of audio, and/or visual playback of multimedia files (e.g., listening to MP3 stereo music, watching an MP4 movie, scrolling through JPEG or GIF pictures, etc.). The retrieving step 418 can also represent the retrieval of multimedia files by the computing device 124.

The printing step 420 can represent a step for directing printing of multimedia to the computing device 124. In this embodiment, the computing device 124 can represent a photo processing center of a retail store (e.g., Walgreens™), or a printing device of the end user or a commercial enterprise. Since the MHDD 122 can store any form of digital information in addition to multimedia files, computer instructions for the controller 106 of the cellular telephone 101 or the controller of the MHDD can also be stored. The computer instructions can represent in this embodiment a common print driver for communicating with a number of printers or photo development machines.

Upon reviewing the aforementioned embodiments, it would be evident to an artisan with ordinary skill in the art that said embodiments can be modified, reduced, or enhanced without departing from the scope and spirit of the claims described below. The MHDD 122 can store computer instructions for the purposes of revising software or firmware of the controllers of either the cellular telephone 101 or the MHDD 122. The MHDD 122 can also be used for the purposes of capturing operational logs which can be useful to the service provider of the cellular telephone 101 for troubleshooting. These are but a few examples of modifications that can be applied to the present disclosure without affecting the scope of said disclosure as defined by the claims below. Accordingly, the reader is directed to the claims section for a fuller understanding of the breadth and scope of the present disclosure.

Figure 5:
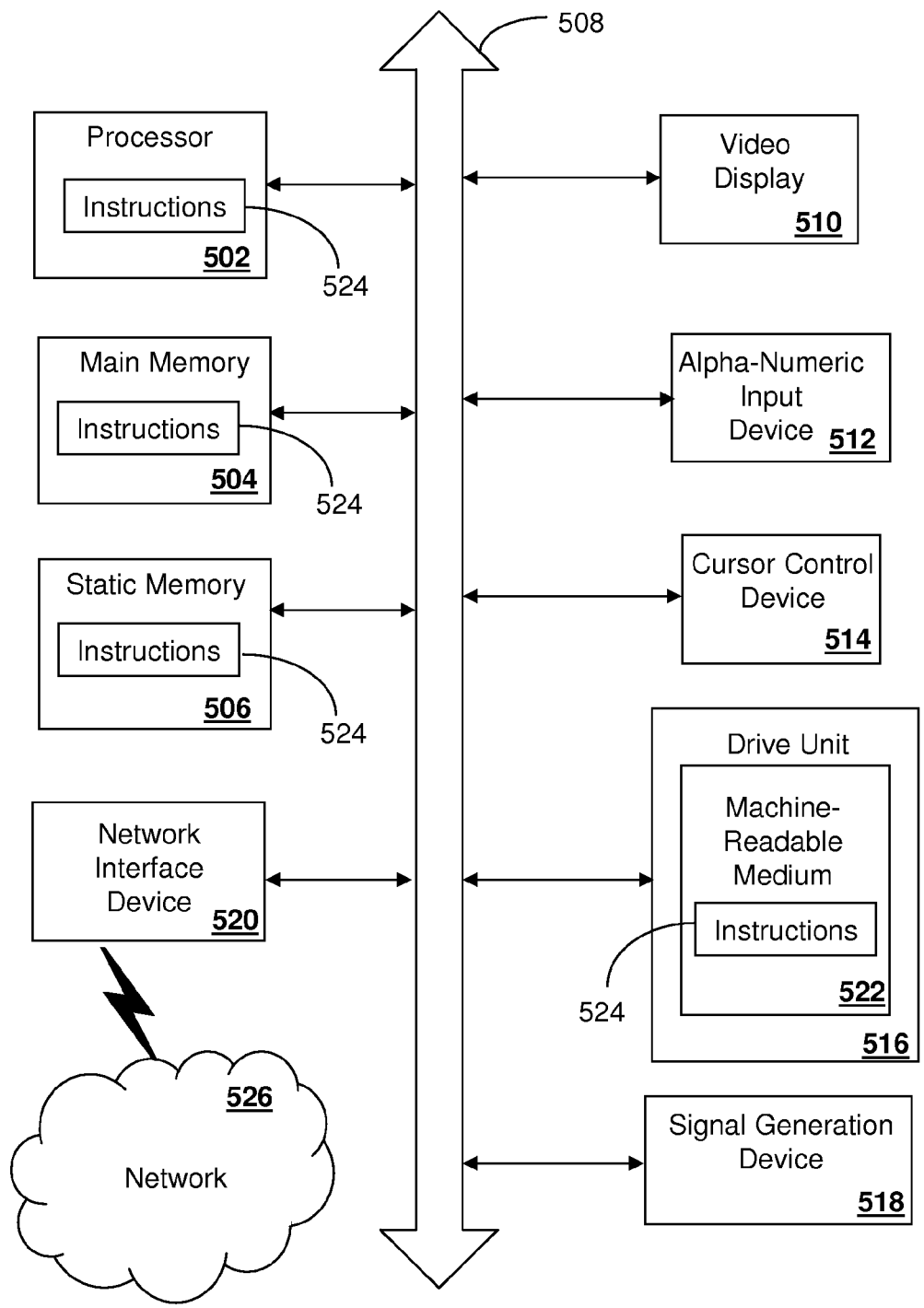
FIG. 5 depicts an exemplary diagrammatic representation of a machine in the form of a computer system within which a set of instructions, when executed, may cause the machine to perform any one or more of the methodologies disclosed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A cellular telephone, comprising:
    a housing assembly; and
    a Modular Hard Disk Drive (MHDD) storage medium slideably insertable and removable from the housing assembly, wherein the MHDD storage medium comprises a short-range wireless device for wirelessly transmitting media files to one of the cellular telephone or a computing device, wherein the housing assembly, comprises:
        a wireless transceiver that exchanges messages with a communication system; and
        a controller that manages operations of the wireless transceiver and the MHDD storage medium.

2. The cellular telephone of claim 1, wherein the wireless messages transmitted by the short-range wireless device conform to at least one among a plurality of 802 communication protocols defined by the Institute of Electrical and Electronics Engineers (IEEE).

3. The cellular telephone of claim 1, wherein the MHDD storage medium comprises a Universal Serial Bus (USB) connector, and wherein the housing assembly comprises:
    a slot having grooves for slidably engaging with the MHDD storage medium; and
    a USB mating connector coupled to the controller and located at an end of the slot that couples to the USB connector of the MHDD storage medium for exchanging data and controlling operations of the MHDD storage medium.

4. The cellular telephone of claim 1, wherein the MHDD storage medium comprises a security element, and wherein the controller determines from the security element whether the MHDD storage medium is operable with the cellular telephone.

5. The cellular telephone of claim 4, comprising a User Interface (UI), wherein the controller presents by way of the UI a prompt to an end user and receives a verification code therefrom, and enables use of the MHDD storage medium responsive to validating the verification code with the security element.

6. The cellular telephone of claim 5, wherein the security element comprises at least one among a Subscriber Identity Module and a Removable User Identity Module, and wherein the UI comprises at least one among a keypad interface, a display and an audio system.

7. The cellular telephone of claim 1, wherein the MHDD storage medium comprises a Universal Serial Bus (USB) that couples to the computing device with a tethered wire for exchanging data.

8. The cellular telephone of claim 7, wherein the data exchanged with the computing device comprises at least one among computer instructions executable by the controller, and one or more multimedia files.

9. The cellular telephone of claim 1, wherein the MHDD storage medium comprises computer instructions corresponding to a print driver executable by the controller for directing a printer coupled to the cellular telephone to print one or more data files stored in the MHDD storage medium.

10. The cellular telephone of claim 1, wherein the controller detects a multimedia processing center by way of the short-range wireless device of the MHDD storage medium, and transmits one or more multimedia files stored in the MHDD storage medium to the multimedia processing center.

11. The cellular telephone of claim 1, comprising an imaging sensor that couples to the controller, wherein the controller directs the imaging sensor to record one among still and moving images, and stores said recorded images in the MHDD storage medium.

12. A cellular telephone, comprising:
    a housing assembly; and
    a Modular Hard Disk Drive (MHDD) storage medium that couples to the housing assembly as an integral portable accessory unit, wherein the MHDD storage medium comprises a short-range wireless device for wirelessly transmitting media files to one of the cellular telephone or a computing device, wherein the housing assembly, comprises:
        a wireless transceiver that exchanges messages with at least one among a plurality of cellular base stations; and
        a controller that manages operations of the wireless transceiver and the MHDD storage medium.

13. The cellular telephone of claim 12, wherein the MHDD storage medium comprises:
    a plurality of snap-on clips that correspondingly couple to a plurality of slots of the housing assembly that mates the MHDD storage medium to the housing assembly; and
    a plurality of contacts that electromechanically couples the MHDD storage medium to a corresponding plurality of contacts of the housing assembly coupled to the controller for exchanging data and operational control of the MHDD storage medium.

14. The cellular telephone of claim 12, wherein the wireless messages transmitted by the short-range wireless device conform to at least one among Bluetooth, Zigbee and WiFi communication protocols.

15. The cellular telephone of claim 12, comprising a User Interface (UI), wherein the MHDD storage medium comprises a security element, and wherein the controller presents by way of the UI a prompt to an end user and receives a verification code therefrom, and enables use of the MHDD storage medium responsive to validating the verification code with the security element.

16. The cellular telephone of claim 12, wherein the MHDD storage medium comprises a communications interface that couples to a computing device, and wherein data exchanged with the computing device comprises at least one among computer instructions executable by the controller, and one or more multimedia files.

17. The cellular telephone of claim 12, wherein the cellular telephone comprises an imaging sensor that couples to the controller, wherein the controller directs the imaging sensor to record one among still and moving images, and stores said recorded images in the MHDD storage medium, and wherein the MHDD storage medium comprises computer instructions corresponding to a print driver executable by the controller for directing a printer coupled to the cellular telephone to print at least one of said stored images.

18. A Modular Hard Disk Drive (MHDD), comprising:
- a storage medium having at least one or more spinnable platters comprising magnetic material;
- a short-range wireless device for wirelessly transmitting media files to one of a cellular telephone or a computing device;
- a controller that manages read-write operations of the storage medium and communications between the MHDD and the cellular telephone; and
- a housing assembly that houses the foregoing components and modularly couples the MHDD to the cellular telephone as an integral portable accessory unit.

19. The MHDD of claim 18, wherein the housing assembly comprises at least one among a clip-on mechanism that couples to a mating clip-on mechanism of the cellular telephone and a slidable form factor that slidably couples to a slot of the cellular telephone, and wherein the short-range wireless device conforms to at least one among a plurality of 802 communication protocols defined by the Institute of Electrical and Electronics Engineers (IEEE).

20. The MHDD of claim 18, comprising a portable power supply that powers the components of the MHDD.

21. The cellular telephone of claim 1, wherein the MHDD storage medium wirelessly communicates with one of the cellular telephone or the computing device without physical engagement with the cellular telephone.

* * * * *